United States Patent

[11] 3,575,457

[72] Inventor Charles C. Wallace
 Portland, Oreg.
[21] Appl. No. 769,315
[22] Filed Oct. 21, 1968
[45] Patented Apr. 20, 1971
[73] Assignee West Coast Wire Rope and Rigging of Portland, Inc.,
 Portland, Oreg.

[54] MUSHROOM HOOK
 4 Claims, 6 Drawing Figs.
[52] U.S. Cl. .................................................... 294/74,
 294/78, 294/83
[51] Int. Cl. ..................................................... B66c 1/12
[50] Field of Search .......................................... 294/74;
 24/114.5, 123 (.1); 114/206

[56] References Cited
UNITED STATES PATENTS
3,123,881 3/1964 Westman ..................... 24/123(.1)
FOREIGN PATENTS
2,468 6/1876 Great Britain ............... 114/206

Primary Examiner—Evon C. Blunk
Assistant Examiner—Douglas D. Watts
Attorney—Kolisch & Hartwell ABSTRACT: A mushroom-shaped hook having a stem to which the free end of a line may be secured and a disc-shaped cap joined to the stem and projecting radially outwardly from and substantially encompassing the stem. The cap is adapted to hook onto material upon which the hook rests to inhibit movement of the hook and the free end of the line on tensing the line. A line-receiving passage extends axially through the stem and a slot along the side of the stem connects with the passage to allow a line to be slipped laterally into the passage. A shoulder is provided within the passage against which a ferrule on the end of such a line may bear to secure the line within the passage.

Patented April 20, 1971 3,575,457
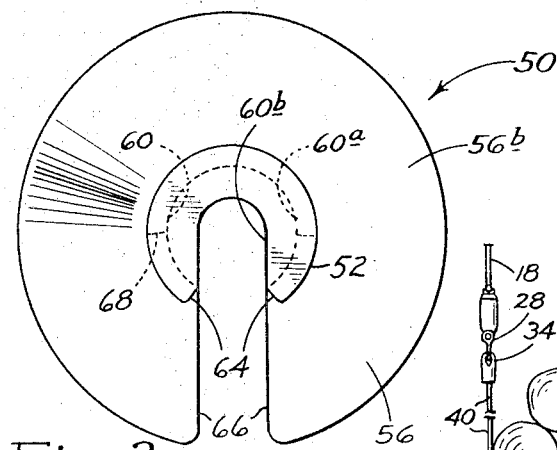
Fig. 3.
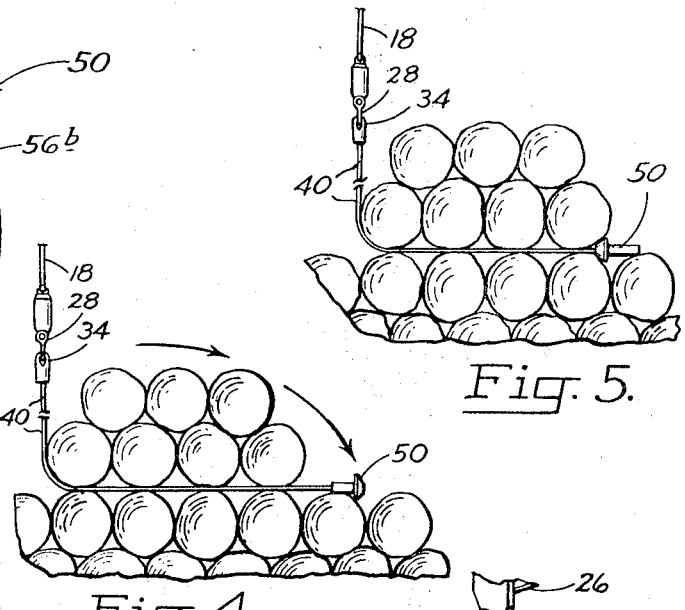
Fig. 4.
Fig. 5.
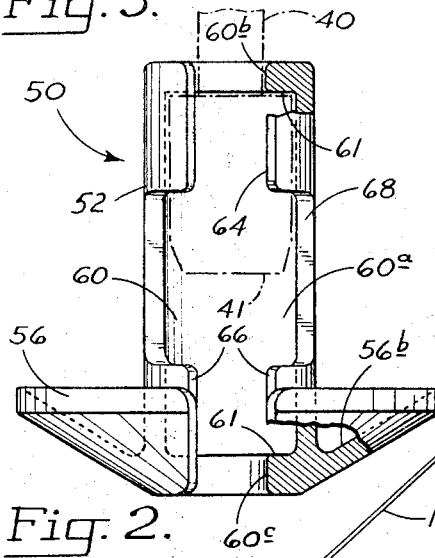
Fig. 2.
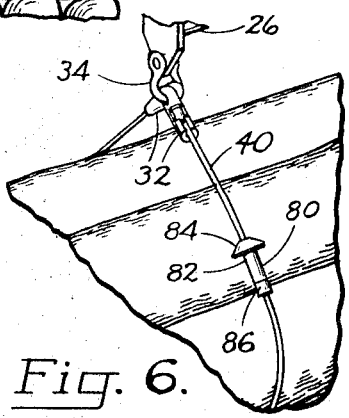
Fig. 6.
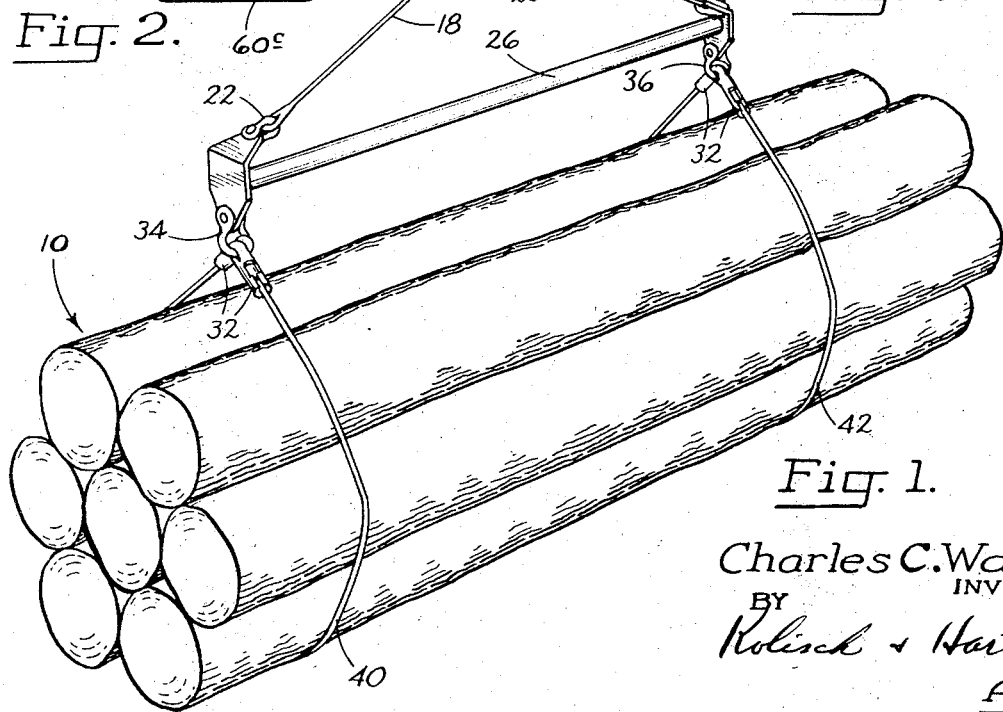
Fig. 1.
Charles C. Wallace
INVENTOR
BY
Rolisch & Hartwell
Attys.

MUSHROOM HOOK

This invention relates to a hook. More specifically it relates to a hook which may be secured to the free end of a line and is adapted to inhibit movement of the free end of the line by hooking onto material upon which the hook rests.

In the handling of logs, or similar items, it is common to hoist a number of logs at one time in a wire rope sling which extends about the logs, and then to transfer them by swinging to a desired location where they are then deposited. In the sling used in such an operation the wire rope or line which extends about the logs is secured at both its ends to lift mechanism above the logs. After the logs have been deposited, one end of the line is freed from the lift mechanism with the other end remaining secured. On lifting the secured end of the line, the remainder of the line is tensed and pulled free of the logs, with the free end passing under the logs.

In such load-handling operations the load often must be deposited laterally of where it is desired that the logs finally rest. An example of this is seen in loading ships. In ships, the hatch through which a load may be lowered into the hold generally is located some distance inwardly from the sides of the hull. Loads lowered through the hatch will, therefore, tend to collect in a region directly beneath the hatch. Some means must be provided to shift the load laterally toward the sides of the hull to distribute the load evenly within the hold.

A general object of the invention is to provide a novel device for aiding in the shifting of loads, such as logs, which device is simple and easily constructed.

Another object is to provide such a novel device which permits a line used as a sling in depositing a load to be used in shifting the load laterally of where it is initially deposited.

More specifically, an object is to provide a novel hook which may be secured to the free end of a line extending under a load, with the hook adapted to hook onto material upon which the load rests and to inhibit movement of the free end of the line while the line is tensed by raising the opposite end of the line. Upon the line being tensed, the load is thrown laterally to distribute it.

Yet another object is to provide a novel hook which has generally a mushroom shape. Thus, it includes a cap which projects radially outwardly from a stem, with the cap substantially encompassing the periphery of the stem. The cap is adapted to hook onto material, a function it can perform regardless of which portion of the cap edge faces down.

Still another object is to provide such a novel hook to which the free end of a line may be simply and easily secured.

In loading logs and similar articles, a more stable pile will be formed if the logs lie substantially parallel to each other with each log resting in a groove formed between two adjacent underlying logs. Unfortunately, logs on being dropped from a sling tend to skew with respect to each other, requiring that they then be straightened.

Another general object is to provide a novel device which may be secured to the free end of a line underlying a misaligned load, which may be used by drawing it out from under a load in a manner to produce straightening of skewed logs and like articles.

More specifically, the invention contemplates a mushroom hook which is reversible with respect to how it is mounted on the end of a line, the hook in one position providing a positive hooking action, and when reversed providing a jostling action promoting alignment.

These and other objects and advantages will become more fully apparent as the following description is read in conjunction with the drawings, wherein:

FIG. 1 is a perspective view of a bundle of logs supported by a hoisting arrangement including wire rope slings secured around the bundle adjacent its opposite ends;

FIG. 2 is a side view of a mushroom hook constructed in accordance with an embodiment of the invention, on a somewhat larger scale, with portions broken away;

FIG. 3 is an end view of the mushroom hook of FIG. 2;

FIG. 4 illustrates the handling of a bundle of logs deposited on top of other logs, and how the hook may be used when attached to a sling line in throwing the logs laterally;

FIG. 5 shows how the hook may be used when turned around or reversed, for the purpose of straightening logs; and FIG. 6 is similar to portions of FIG. 1, illustrating a modification of the invention.

Referring now to the drawings, and first more specifically to FIG. 1, at 10 is indicated generally a bundle of logs in the process of being handled by conventional hoisting apparatus indicated generally at 12. The hoisting apparatus includes a hoist line 14 having a shackle 16 connected to its lower end, to which one set of ends of a pair of diverging cables 18, 20 are connected. The opposite set of ends of cables 18, 20 are connected to shackles 22, 24 secured to opposite ends of a spreader bar 26.

Bundle of logs 10 is dependently supported from spreader bar 26 by wire ropes or lines 40, 42 forming slings adjacent opposite ends of the bundle of logs. As is conventional with the hoisting apparatus illustrated, each of the ends of these wire ropes has a ferrule anchored to it, such as the ferrule shown in FIG. 2 in dashed outline at 41 connected to the end of wire rope 40 partially shown in FIG. 2. A sling is formed, as illustrated in FIG. 1, from each of the wire ropes by detachably coupling the ends of the wire rope through so-called butt hooks 32 to one of the shackles 34, 36 provided at the ends of the spreader bar. The butt hooks being conventional have not been shown in detail, but it should be understood that each includes, in addition to an eye portion at its upper extremity which fits about the shackle, a suitable socket recess adjacent the base of the hook which detachably seats the ferrule at the end of the wire rope with the rope permitted to depend outwardly from the base of the hook.

In the usual hoisting operation, hoisting line 14 depends from a crane or similar apparatus, and the line is taken up or let out by operation of the usual winch. In depositing a load, the spreader bar with depending slings is lowered by letting out the line until the bundle of logs comes to rest against an underlying supporting surface. The logs are then released by uncoupling an end of each of the wire ropes that forms a sling from its associated butt hook and then pulling up on the spreader bar through hauling in the hoisting line to draw the wire rope out from under the bundle of logs.

As discussed briefly above in the loading of the hold of a ship or similar spaces with logs, and using equipment of the type just described, the logs are deposited using the operation outlined. The logs, however, tend to accumulate directly beneath the hatch which opens up to the hold necessitating that some of the logs subsequently be moved laterally to fill up the sides of the hold. As contemplated by this invention a novel mushroom hook is provided which is adapted releasably to be connected to each of the free ends of the wire ropes after they have been uncoupled to release the bundle of logs. The hook is constructed to hook onto one of the logs in the underlying mass of logs which the bundle is deposited upon and by so doing to hold the free end of a wire rope to prevent the same from sliding out from under the bundle with raising of the spreader bar. With each of the wire ropes held by such a hook, and on raising of the spreader bar, the logs resting on the ropes will be thrown laterally, thus to distribute them in the manner desired within the hold. As will also be discussed below, the mushroom hook is reversible, i.e., it may be detachably connected to the end of the wire rope with its ends turned about, and when mounted in this manner can be used to facilitate the straightening out of skewed logs.

A hook as contemplated by one form of the invention is shown at 50 in FIGS. 2 and 3. Referring to these FIGS. it will be seen that the hook includes an elongated cylindrical stem 52, and a circular, or disc-shaped cap 56, which is joined to one end of the stem. The latter projects radially outwardly from the stem, and substantially encompasses the periphery of the stem.

Extending axially throughout the length of the mushroom hook is a passage 60. The passage has a central portion 60a having a diameter slightly larger than the diameter of the usual ferrule that is provided at the end of the wire sling rope. The ends of the passage designated at 60b and 60c have a slightly lesser diameter. These end portions of the passage have a diameter sufficient to accommodate the passage of a sling wire rope through them. Because of the reduced diameter of the passage end portions, a shoulder is defined adjacent each end of the mushroom hook exemplified by the shoulders shown at 61 in FIG. 2.

Stem 52 has a slot 64 in the side thereof adjacent the upper end of the stem in FIG. 2. The slot is approximately as wide as passage portions 60b, 60c. The opposite end of the mushroom hook has a slot 66 formed in the side thereof which extends both through the cap and the lower extremity of the stem in FIG. 2. This slot is aligned with and has substantially the same width as slot 64. Intermediate the slots 64, 66, and joining with these slots as well as with central portions 60a of the passage is an enlarged opening 68. The opening has a width substantially corresponding to the diameter of passage central portion 60a. The slots and opening are referred to collectively herein as slot means.

It will be seen that cap 56 is, in essence, a hollow truncated cone which presents a convex surface 56a facing in one axial direction (downwardly in FIG. 2) and a concave surface 56b facing in the opposite axial direction (toward the upper end of the stem in FIG. 2).

Explaining how mushroom hooks of the type described might be employed in the distributing of logs, FIG. 4 illustrates a bundle of logs after its deposit on an underlying mass of logs, and shows one end of a sling wire rope freed from the spreader bar. Although not shown by reason of being obscured in the drawings, it should be understood that one end of the other sling wire rope used in handling the bundle is similarly free.

A mushroom hook 50 may then be detachably secured to the free end of each rope by slipping the free end of the rope and its ferrule into the line-receiving passage 60 of the hook, with the line extending axially outwardly from the stem end of the hook. Opening 68 permits placement of the ferrule inside the stem by moving it laterally into the stem. With the ferrule inside the stem, the ferrule and rope may be shifted axially to bring the ferrule into proper seated position and resting on shoulder 61 at the stem end of the hook.

The mushroom hook on each sling wire rope is then rested on previously deposited logs, as illustrated in FIG. 4. The peripheral edge of the cap in a hook will operate to hook onto a log beneath it, thus to inhibit movement of the hook and the end of the wire rope to which it is connected on tensing of the rope. If the spreader bar in the sling apparatus is raised by elevating line 14, this causes tensioning of the wire rope connected to the mushroom hook with such lifting behind the logs just deposited, with such logs eventually being thrown laterally off the rope and to the right in FIG. 4.

It should be noted that no special precautions are required in laying down the hook as it is substantially symmetrical about its longitudinal axis. This means that irrespective of what side of the hook is down proper hooking action is obtained. Furthermore, because of the selected shape of the cap proper rigidity is obtained in the hook without excessive mass.

Logs deposited on a support with the sling apparatus disclosed sometimes will tend to become skewed requiring that they be straightened to produce a compact and stable stack. The mushroom hook of the invention is constructed so that it may be mounted on the end of a sling wire rope with the hook turned end for end from the position just described. With this mounting of the hook the convex face of the cap faces the end of the sling wire rope which is attached to the spreader bar. This is the position for the mushroom hook illustrated in FIG. 5. With a hook, or hooks, attached to one or more of the sling wire ropes in this reversed position, as illustrated by the hook in FIG. 5, on tensing of the wire rope, the hooks do not positively hook onto the log, but instead are drawn out from under the load of logs with tugging and jostling of the logs as the hook passes thereunder. This has been found to tend to produce straightening, with the end of a skewed log that first comes into contact with a hook being moved inwardly on the pile.

In mounting the hook in its reversed position the ferrule is slipped into the stem of the hook in the same manner as described in connection with the first discussed use of the hook. The wire rope, however is made to extend out from the cap end of the hook and the ferrule in this instance sits against the shoulder which is shown at the base of the hook in FIG. 2.

Referring now specifically to FIG. 6, here a modified mushroom hook 80 is illustrated which is somewhat similar to that previously described at 50. In this modified form, the hook is carried on the line at all times, rather than being easily detachable, as was the mushroom hook 50.

Mushroom hook 80 is similar to hook 50 in that it includes an elongated cylindrical stem 82 and a disc-shaped cap 84 joined to one end of the stem. The cap presents a convex surface facing one axial direction and a concave surface facing in the other axial direction. The hook differs in that the line-receiving passage in this instance comprises an axially extending bore of uniform cross section extending the length of the hook, the diameter of such bore being slightly greater than the diameter of the wire rope.

In mounting this hook a ferrule such as the one shown at 86 is mounted on the wire rope slightly inwardly from one end. The wire rope without any ferrule on its extreme end is then threaded through the axially extending bore of the hook whereby the wire rope passes through it as shown in FIG. 6. The usual ferrule may then be secured to the extreme end of the rope used in connecting the wire rope to butt hook 32.

With the hook permanently attached as in this modification of the invention the hook is placed in operative position merely by detaching the end of the wire rope from butt hook 32 and then moving the hook along the wire rope until the ferrule at the end of the wire rope contacts the outer face of cap 84.

While embodiments of the invention have been described, it should be obvious that variations and further modifications are possible without departing therefrom.

I claim:

1. A mushroom hook comprising an axially disposed stem, and a cap joined to the stem projecting radially outwardly from and substantially encompassing the periphery of the stem adapted to hook onto material, said stem having a line-receiving passage extending fully throughout the length thereof, said mushroom hook having slot means in a side of said stem and in a side portion of the cap joining with said passage and opening up the passage throughout its entire length to a side of the mushroom hook to accommodate the passage of a line through said slot means into said passage.

2. The mushroom hook of claim 1, wherein said slot means includes a slot in said cap, a slot in said stem aligned with the slot in the cap, and an opening between said slots having a greater width than the width of the slots.

3. The hook of claim 2, wherein a shoulder is provided within said passage adjacent each end of the stem.

4. The hook of claim 1, wherein the surface of the cap facing in one axial direction is convex and the surface facing the opposite axial direction is concave.